(12) United States Patent  
Hoppe et al.

(10) Patent No.: US 7,078,842 B2  
(45) Date of Patent: Jul. 18, 2006

(54) ELECTRIC MACHINE WITH A DAMPING DEVICE

(75) Inventors: Thomas Hoppe, Schwabhausen (DE); Dietmar Stoiber, Fürth (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/943,503

(22) Filed: Sep. 17, 2004

(65) Prior Publication Data

US 2005/0062356 A1 Mar. 24, 2005

(30) Foreign Application Priority Data

Sep. 18, 2003 (DE) ................. 103 43 293

(51) Int. Cl. *H02K 1/00* (2006.01)

(52) U.S. Cl. ............. 310/182; 310/183; 310/197

(58) Field of Classification Search ........ 310/182, 310/183, 186, 190, 256, 187, 197, 210, 213, 310/225

See application file for complete search history.

(56) References Cited

U.S. PATENT DOCUMENTS

| | | | | |
|---|---|---|---|---|
| 848,719 A * | 4/1907 | Bretch | ............... | 310/173 |
| 1,537,737 A * | 5/1925 | Bergman | ............... | 310/174 |
| 1,916,462 A * | 7/1933 | Dreyfus | ............... | 310/225 |
| 3,369,139 A * | 2/1968 | Neumann | ............... | 310/102 R |
| 5,350,991 A * | 9/1994 | Bae | ............... | 318/727 |
| 5,677,586 A * | 10/1997 | Horst | ............... | 310/103 |
| 6,313,557 B1 * | 11/2001 | De Filippis et al. | ....... | 310/216 |
| 6,707,222 B1 * | 3/2004 | Hsu et al. | ............... | 310/254 |
| 6,720,699 B1 * | 4/2004 | Shah et al. | ............... | 310/197 |
| 6,965,183 B1 * | 11/2005 | Dooley | ............... | 310/201 |

FOREIGN PATENT DOCUMENTS

| | | |
|---|---|---|
| DE | 192 719 A | 11/1907 |
| DE | 24 33 618 | 1/1976 |
| DE | 28 34 378 | 11/1979 |
| DE | 38 26 282 A1 | 2/1990 |
| DE | 100 49 817 A1 | 4/2002 |
| EP | 0 117 764 A1 | 9/1984 |
| EP | 0 681 361 A1 | 11/1995 |
| JP | 2002-218691 | 8/2002 |

\* cited by examiner

*Primary Examiner*—Dang Le  
(74) *Attorney, Agent, or Firm*—Henry M. Feiereisen

(57) ABSTRACT

An electric AC machine with a primary section and a secondary section is disclosed. The primary section has a region facing the secondary section and a region facing away from the secondary section. The region facing the secondary section has windings adapted to receive an AC current. The winding of the primary section has at least one phase conductor which at least partially extends in or on the region of the primary section facing away from the secondary section, thereby producing a magnetic field that extends outside the secondary section. This arrangement can reduce overvoltages and eliminate voltage breakdowns at the star point of winding strands of a synchronous motor.

6 Claims, 4 Drawing Sheets

ELECTRIC MACHINE WITH A DAMPING DEVICE

CROSS-REFERENCES TO RELATED APPLICATIONS

This application claims the priority of German Patent Application, Serial No. 103 43 293.0, filed Sep. 18, 2003, pursuant to 35 U.S.C. 119(a)–(d), the disclosure of which is incorporated herein by reference.

BACKGROUND OF THE INVENTION

The present invention relates to an electric machine with a damping device. The electric machine is an AC machine or a three-phase machine, and can be implemented as a rotary machine or as a linear motor.

Nothing in the following discussion of the state of the art is to be construed as an admission of prior art.

Electric machines, in particular synchronous motors, are frequently constructed by inserting specially formed winding wires in rotor or stator grooves. The winding wires are connected at the winding head to form winding strands. A winding strand can have several coils, depending on the number of poles. In three-phase machines, each phase has at least one winding strands, with the winding strands being connected at a star point. An exemplary a three-phase synchronous motor with four poles has three winding strands, each having four coils that are connected at the star point. The input voltages of the three-phase current are connected to the terminals of corresponding winding strands located on the other side of the star point.

The windings of linear motors and more recently also of synchronous motors, which must have a high torque, are implemented in exciter coil technology. In other words, the magnetic cores are made of laminated metal sheets with teeth that operate as pole cores. The prefabricated coils are placed on the individual pole cores and suitably connected. The prefabricated coils are made of a support or coil bobbin which is fabricated of an electrically insulating material, and include insulated copper wires which are typically applied by machines. Optionally, the support can also be removed after the winding has been completed, if the windings themselves have enough stability.

The electric machine can receive electric power from a converter, which can be an inverter. The converter can include, for example, an inverter, a DC link circuit and a rectifier.

During operation of electric motors powered by pulse converters, the switching operations of the converter can cause voltage peaks between the motor winding and the grounded motor body. The motor winding operates as a reactant network conductor that is capacitively coupled to ground via the winding insulation. The voltage peaks are particularly large at the end of the reactant network conductor, which is frequently the star point of the winding. The reactant network conductor is also characterized by resonances and a resonant frequency. If all input terminals of the motor winding are simultaneously switched hard in one direction, then an electric oscillation with a characteristic frequency is produced between the motor winding and ground potential, which decays only slowly due to the weak natural damping. If the switching operations on the input terminals are periodic and their fundamental frequency or harmonics are close to the characteristic frequencies of the reactant network conductor of the motor winding, then the voltage peaks can become so large as to diminish the useful life of the insulation. Voltage peaks due to switching operations are therefore undesirable.

Breakdowns at the star point of three-phase motors constructed with the exciter coiled technique can occur in particular in large converter installations.

Similar problems can occur with electric machines suffering from transient overvoltages. The overvoltages should hence be limited to prevent breakdowns. For example, as disclosed in German patent publication no. DE 38 26 282, a voltage-dependent metal oxide resistor can be connected in parallel with a coil for limiting the overvoltage. German patent publication no. DE 28 34 378 discloses short-circuited winding sections for damping transverse fields. Likewise, German patent publication no. DE 24 33 618 discloses a method for damping transient overvoltages in a synchronous machine by applying transverse field damper rods.

European patent publication no. EP 0 117 764 describes a method for suppressing overvoltages produced by resonance phenomena through application of ferroelectric isolators disposed between the coil windings. European patent publication no. EP 0 681 361 addresses the problem associated with higher harmonic oscillations which can occur in converters and rectifiers employing power thyristors. The damper winding is then connected with capacitors to form resonant circuits. The resonant circuits have a resonance frequency which is 6n times greater than a fundamental frequency of synchronous machine. In this way, higher harmonic oscillation of the fundamental can be absorbed.

Nevertheless, there remain problems of breakdowns in the star point of a synchronous motor produced with exciter coil technique. German patent publication no. DE 100 49 817 discloses an induction device as well as a method for operating electric machines that reduce the risk of a breakdown in the star point. This published patent application discloses an induction device with a winding arrangement having a winding start and a winding end for inducing a magnetic field in a magnetizable core and a lossy magnetizable device. The winding start and the winding end of the winding assembly are routed through or around the lossy magnetizable device in such a way that a magnetic flux is excited in the lossy magnetizable device.

A drawback of conventional devices is the need for additional installation space and added costs.

It would therefore be desirable and advantageous to provide an improved damping device for an electric machine, which is compact and can be manufactured cost-effectively.

SUMMARY OF THE INVENTION

According to one aspect of the invention, an electric AC machine includes a primary section and a secondary section. The primary section has a first region facing the secondary section and a second region facing away from the secondary section. The first region includes windings adapted to receive an AC current. The electric AC machine further includes at least one phase conductor, which at least partially extends in or on the second region and produces a magnetic field that is located outside the secondary section.

According to another aspect of the invention, an electric AC machine includes a primary section and a secondary section, with the primary section having a plurality of windings adapted to receive an AC current and a closed conducting loop with at least one winding.

Advantageous embodiments of the invention may include one or more of the following features.

According to one advantageous embodiment, the region facing the secondary section is made of a magnetic material and does not include an air gap. The region facing the secondary section can be made as a single unitary piece with the region facing away from the secondary section.

Advantageously, the windings are located in grooves which are formed by the teeth of the primary section. The teeth of the primary section located on the side of the primary section facing the secondary section can be made as one-piece with the primary section.

Damping is achieved by placing at least one phase conductor of a winding in the region of the primary section facing away from the secondary section. Damping is caused by the magnetization of the region of the primary section that faces away from the secondary section. Advantageously, the magnetic fields necessary to produce an electromagnetic force of the electric DC machine are not affected by the damping fields. According to an advantageous embodiment of the electric machine, the phase conductor or conductors are guided in a cavity of the primary section. The primary section surrounding the cavity forms the core of the damping inductance. In an advantageous embodiment, the core of the damping inductance is separated by an air gap. According to another advantageous embodiment, the core of the damping inductance is formed by the primary section and by a bridge, which together form the cavity.

According to another advantageous embodiment, the phase conductors of all three phases of a three-phase machine are routed through the cavity of the core of the damping inductance. Ideally, the sum of the three-phase current of the three phases is equal to zero.

According to another embodiment, a feed and a return conductor of a strand having approximately zero current is routed through the core of the damping inductance.

According to another advantageous embodiment, several feed and return pairs of a strand having a zero sum current is guided through the core of the damping inductance.

Advantageously, the core of the damping inductance is provided with a short-circuit winding for damping the induced flux. The short-circuit winding is a closed conducting loop which extends close to the phase conductor and is electrically coupled to the phase conductor. If the primary section has a closed conducting loop with at least one winding, then the winding is advantageously located in a region of the primary section facing away from the secondary section.

According to an advantageous embodiment, the closed conducting loop is implemented as a weld seam extending along the core of the damping inductance and/or around a bridge. The bridge is advantageously made of a soft magnetic material.

The core is the region that guides the magnetic flux produced by the phase conductor that affects the damping.

According to an advantageous embodiment of the electric machine, no additional components are required and instead, already existing openings in the laminated core can be used as core for the damping inductance. This saves costs and installation space. In motors with forced cooling, the heat dissipated in the damping inductance is well coupled to the heat carried away from the motor by the sheet metal of the motor. Accordingly, the damping inductance can sustain a large power density without additional measures, which also reduces the required installation space.

If several different phase conductor groups are routed through different damping inductances (which extend transversely to the sheet metal direction and also transversely through the motor from the A-side to the B-side), then the motor winding can alternatingly be connected from one side of the motor (for example the B-side) to the other side of the motor (for example the A-side). This reduces the space requirement for the electrical connections.

An electric AC machine has a primary section and a secondary section. The primary section includes windings adapted to receive an AC current. The primary section also has a closed conducting loop with at least one winding. A damping device for damping oscillations can be implemented with the closed conducting loop having one or more windings. The oscillations are produced by a system that has at least one converter and an electric machine. The system can also include commutation chokes, line filters, and capacitive as well as parasitic elements in the form of wires or in the form of an electric machine. The system and the associated oscillation circuit is excited by switching operations in the feed line of the converter. The system reacts to the step-like signals produced by the converter with a characteristic system response. The excitation of the system is particularly strong if several axes, i.e. several electric machines, switch essentially simultaneously in all three phases. This can occur, for example, in the event of a controlled shutdown of a facility. Oscillations can occur over several switching periods of the converter during which the system very strongly oscillates. In addition, there is the already described secondary resonance of the electric machine, which can be described more particularly by the recurrent network model.

Such problems can be solved with a damping device that has a closed conducting loop with at least one winding.

Increasing the damping not only results in a more rapid decay of the oscillation, but also significantly reduces the amplitude of the resonance maximum of the recurrent network resonance circuit. An additional device of a type disclosed in German patent publication no. DE 100 49 817 can be connected upstream of the motor as an integral component of the motor.

Advantageously, according to the invention, the recurrent network resonance of the motor winding is damped by using components that already exist in the motor. In particular, the magnetic cores of the damping inductances that would otherwise require additional installation space and tend to be expensive, are essentially provided by the magnetic circuit of the motor. The zones of a laminated sheet metal laminate that face away from the air gap and therefore have only a minor effect or no effect at all on the magnetic properties can provide a suitable magnetic circuit for the aforementioned damping inductance. This eliminates an adverse effect on the actual motor function.

According to an advantageous embodiment of the electric AC machine, a winding of the primary section has at least one phase conductor which is at least partially located next to a closed conducting loop. The increased inductance thereby enhances the damping effect.

Damping can also be enhanced with a closed conducting loop having several windings. The damping effect can also be enhanced if the phase conductor is routed multiple times next to the closed conducting loop, as is known from the operating principle of transformers. Damping can be further enhanced by inserting damping elements in the closed conducting loop. Damping elements are, for example, a resistor as well as a parallel or series connection of capacitors and inductances.

According to another advantageous embodiment of the electric AC machine, the phase conductor and the closed conducting loop surround the flux-conducting body and/or an air gap in this body.

The body conducting the magnetic flux is, for example, comparable to a joke of a transformer or the sheet metal laminate of an electric machine. The increases the coupling with the oscillatory system and thereby also the damping effect of the closed conducting loop.

According to an advantageous embodiment, the primary section includes a means for guiding a magnetic flux, whereby the guiding means can be a sheet metal laminate.

Many sheet metal parts of electric machines have open recesses or enclosed openings, which are needed during the production for handling the individual metal sheets, or which are incorporated in the metal sheets to save weight. The recesses or openings are no longer necessary after assembly and also do not serve a magnetic function. Advantageously, such existing closed openings or recesses in the stamped sheet metal can be used as a magnetic core for the damping inductance.

According to an advantageous embodiment of the electric AC machine, the means for guiding the magnetic flux is formed in at least two parts, wherein one part can be formed by the sheet metal laminate and the second part by a bridge. The sheet metal laminate together with the bridge form a cavity. Both the closed conducting loop and the phase conductor can be routed through this cavity.

According to another advantageous embodiment of the electric AC machine, the sheet metal laminate forms an air gap with the bridge. This permits adjustment of the damping effect of the damping device, which is formed, for example, by the closed conducting loop. Advantageously, recesses can be provided in the sheet metal laminate when using at least one bridge.

An open recess can be closed by adding a suitable bridge which can be made of a soft magnetic material. For cost reasons, the soft magnetic bridge can be formed from stamping waste.

So as not to interfere with the operation of a three-phase motor, it is proposed to route those phase conductors as a common group through the magnetic core of the damping inductance whose sum of the currents in normal three-phase operation is equal to zero, because under these circumstances the three-phase operation does not produce a load on the core of the damping inductance. If switching operations occur simultaneously at all input terminals, which can cause an undesirable recurrent network resonance, then the sum of the currents in the aforementioned phase conductor group is different from zero, corresponding precisely to the unwanted capacitive recurrent network current. Since the capacitive recurrent network current is an AC current, this AC current excites a changing magnetic flux in the damping inductance. The changing magnetic flux is known to cause magnetic reversal losses in the magnetizable material, which dampen the unwanted recurrent network resonance.

Because of the phase conductors have to be routed through the core of the damping inductance, the core is advantageously formed by an open recess in the motor lamination, which is closed by a soft-magnetic bridge after insertion of the phase conductors. The labor-intensive threading of the phase conductors through a closed opening can thus be eliminated.

If the core of the damping inductance is formed by the aforementioned open recesses in the motor, then the soft-magnetic bridge can advantageously be made of a material with a high internal magnetic reversal losses. This results in a large damping.

A particularly large damping effect can be achieved by tapping the magnetic flux of the damping inductance with a secondary winding associated with the damping inductance and dissipating the current in the secondary winding in a resistor.

Advantageous embodiments of the core will be described hereinafter by way of examples:
1. The core of the damping inductance is formed by a closed opening in the sheet metal of the motor;
2. The core of the damping inductance has the width of the sheet metal elements;
3. The core of the damping inductance is narrower than the sheet metal element;
4. The core of the damping inductance has an air gap for affecting the inductance;
5. The core of the damping inductance is formed by an open recess in the sheet metal element of electric machine, with which a soft-magnetic bridge is associated. The bridge can be constructed as follows:
   5.1 the soft-magnetic bridge is made of the same material at the sheet metal element;
   5.2 the soft-magnetic bridge is made from stamping waste of the sheet metal element;
   5.3 the soft-magnetic bridge is made of a material with high magnetic reversal losses.

The core is hereby the region is formed by a soft-magnetic material, in which the magnetic flux that is produced by an electric conductor is or can be guided.

According to another aspect of the invention, a method for operating an electric AC machine is disclosed. The electric AC machine has the primary section and a secondary section, wherein the primary section has windings in the form of phase conductors adapted to receive an AC current, and the phase conductor produces a magnetic damping field. This magnetic damping field extends at least partially in the primary section, and is therefore outside the secondary section. Accordingly, the magnetic fields required for producing the electromagnetic force is substantially unaffected by the magnetic damping field.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
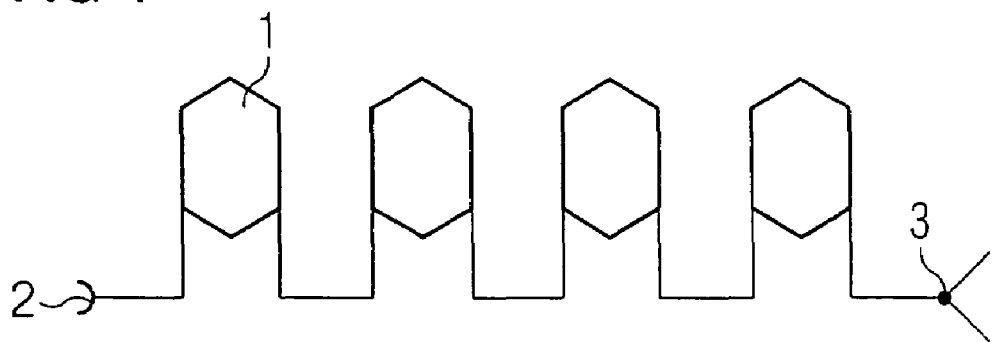
FIG. 1 shows an electric circuit diagram of a conventional winding strand.

Throughout all the Figures, same or corresponding elements are generally indicated by same reference numerals.

These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic circuit diagram of a typical winding strand of a three-phase machine, wherein four coils 1 are implemented in exciter coil technique. The exciter coils 1 depicted an hexagons are connected in series and electrical power is supplied via an input terminal 2. The end of the winding strand opposite the terminal 2 is connected to a star point 3. The additional winding strands are also connected to this star point 3, as mentioned above.

Figure 2:
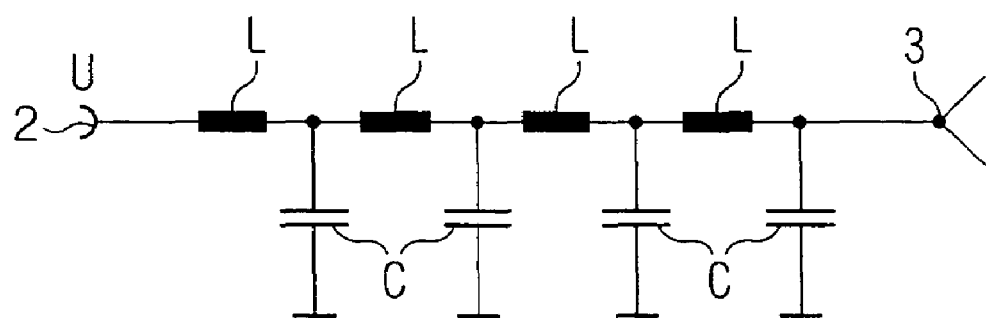
FIG. 2 shows an electric equivalent circuit diagram for the circuit diagram of FIG. 1.

The asymmetric equivalent circuit diagram of the electric circuit depicted in FIG. 1 is shown in FIG. 2. The inductance of each coils 1 is indicated by L. As seen in FIG. 1, the various inductances are connected in series. Each coil 1 is capacitively coupled to the pole core on which it is located. The respective capacitances C are depicted in FIG. 2 as bypass capacitances to ground, wherein ground is the magnetic core. A voltage U is applied to the input terminal 2.

Figure 3:
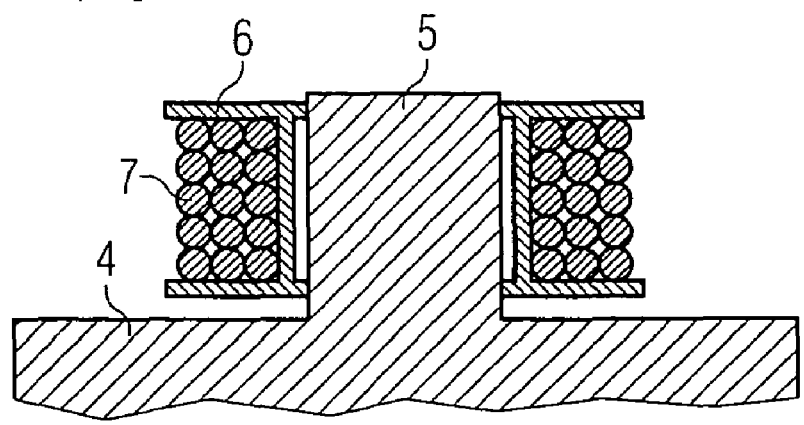
FIG. 3 shows a cross-section of a conventional exciter coil winding.

The actual construction of a magnetic pole with exciter coil windings is illustrated in FIG. 3. A magnetic core 4 includes a tooth 5 and/or a pole core 5, on which a coil bobbin 6 can be placed. The coil bobbin 6 includes the winding 7 which is wound on the coil bobbin 6 layer-by-layer to form an exciter coil. The coil bobbin 6 isolates the winding from the pole core 5 that is made of sheet metal. The isolation has to be designed so as to prevent breakdown between the two components.

Figure 4:
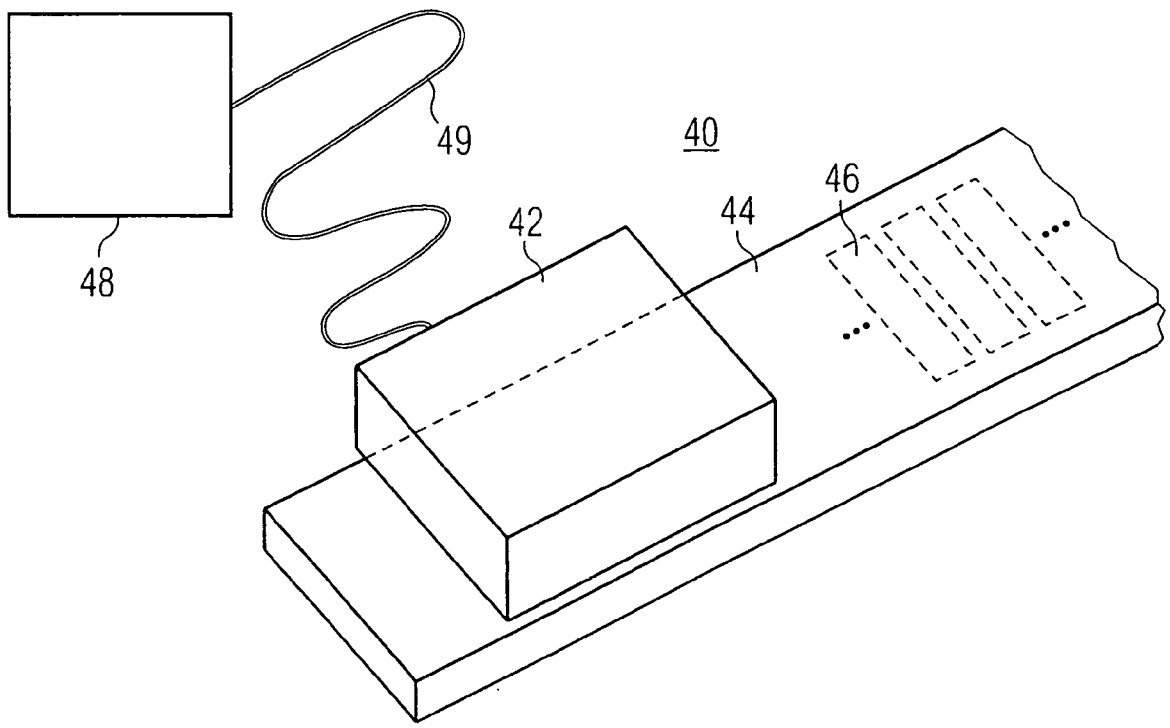
FIG. 4 shows schematically a linear motor.

Converters are frequently used for controlling synchronous motors and, more particularly, linear synchronous motors. Converters typically generate square-wave control voltages. FIG. 4 shows a linear motor 40 with a primary section 42 and a secondary section 44. The secondary section 44 has permanent magnets 46. The primary section 42 is connected by a cable 45 with a converter 48 that supplies power to the primary section.

Figure 5:
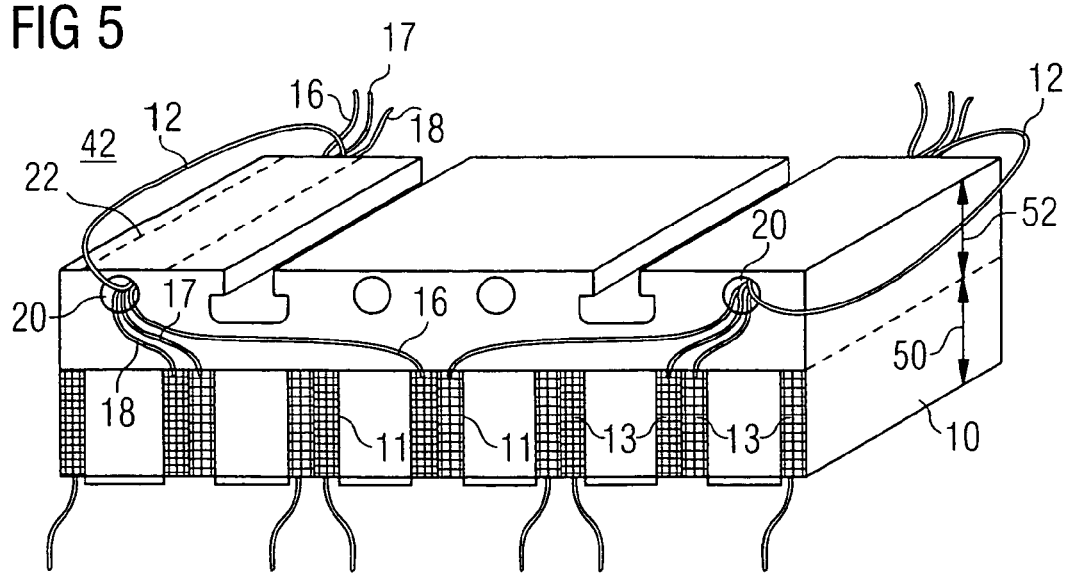
FIG. 5 shows schematically a first cross-sectional view of a primary section of a linear motor.

FIG. 5 shows a perspective cross-sectional view through a primary section of a linear motor. The primary section 42 has a sheet metal laminate 10. The sheet metal laminate has grooves 11, in which windings 13 are disposed. The windings 13 are formed by phase conductors 16, 17 and 18. The phase conductors 16, 17 and 18 together with a closed conducting loop 12 are routed in a cavity 20. The closed conducting loop 12 encloses, for example, a region 22 of the sheet metal laminate 10 indicated by a dashed line. The magnetic flux produced by the combined phase conductors 16, 17 and 18 is closed in the region 22.

Figure 6:
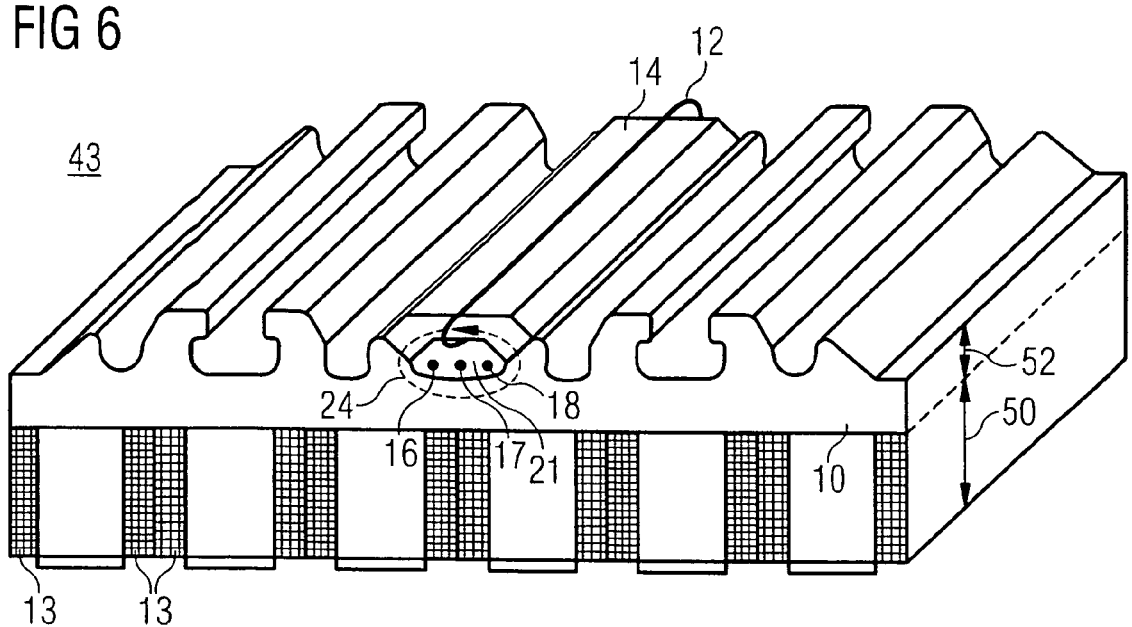
FIG. 6 shows schematically a second cross-sectional view of a primary section of a linear motor.

FIG. 6, similar to FIG. 5, shows a cross-sectional view of a primary section 43 of a linear motor. However, unlike FIG. 5, the cavity 21 in FIG. 6 is formed by the sheet metal laminate 10 and a bridge 14, with both the phase conductors 16, 17 and 18 and the closed conducting loop 12 being routed through the cavity. The magnetic flux 24 enclosed by the closed conducting loop 12 is indicated by a dot-dashed line.

Figure 7:
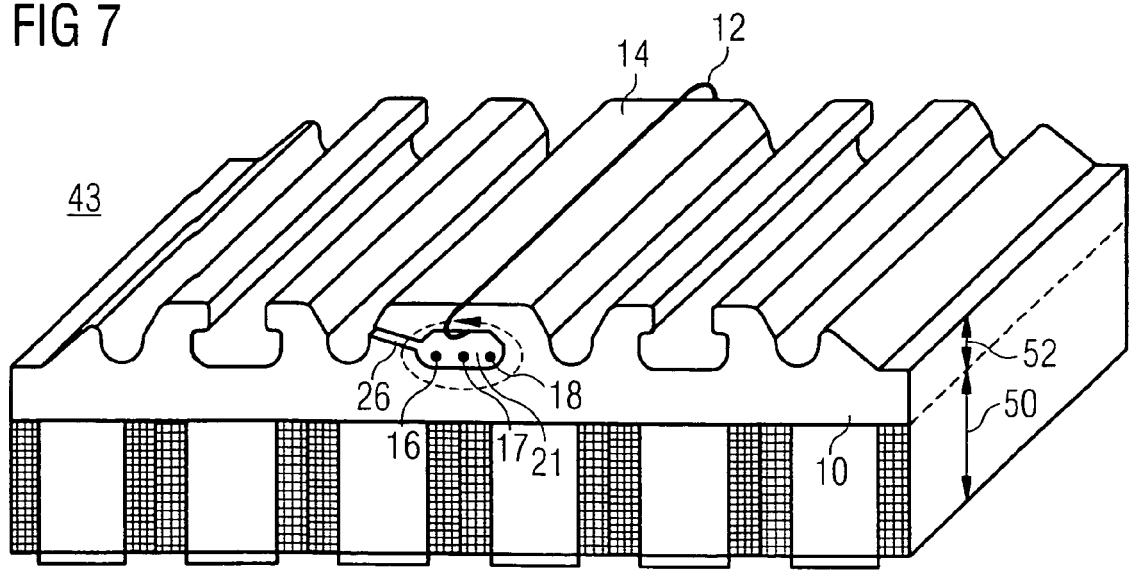
FIG. 7 shows schematically a third cross-sectional view of a primary section of a linear motor.

FIG. 7 shows another cavity 21 formed by the bridge 14. However, the body conducting the magnetic flux has now an air gap 26, which can be used to adjust the damping.

Figure 8:
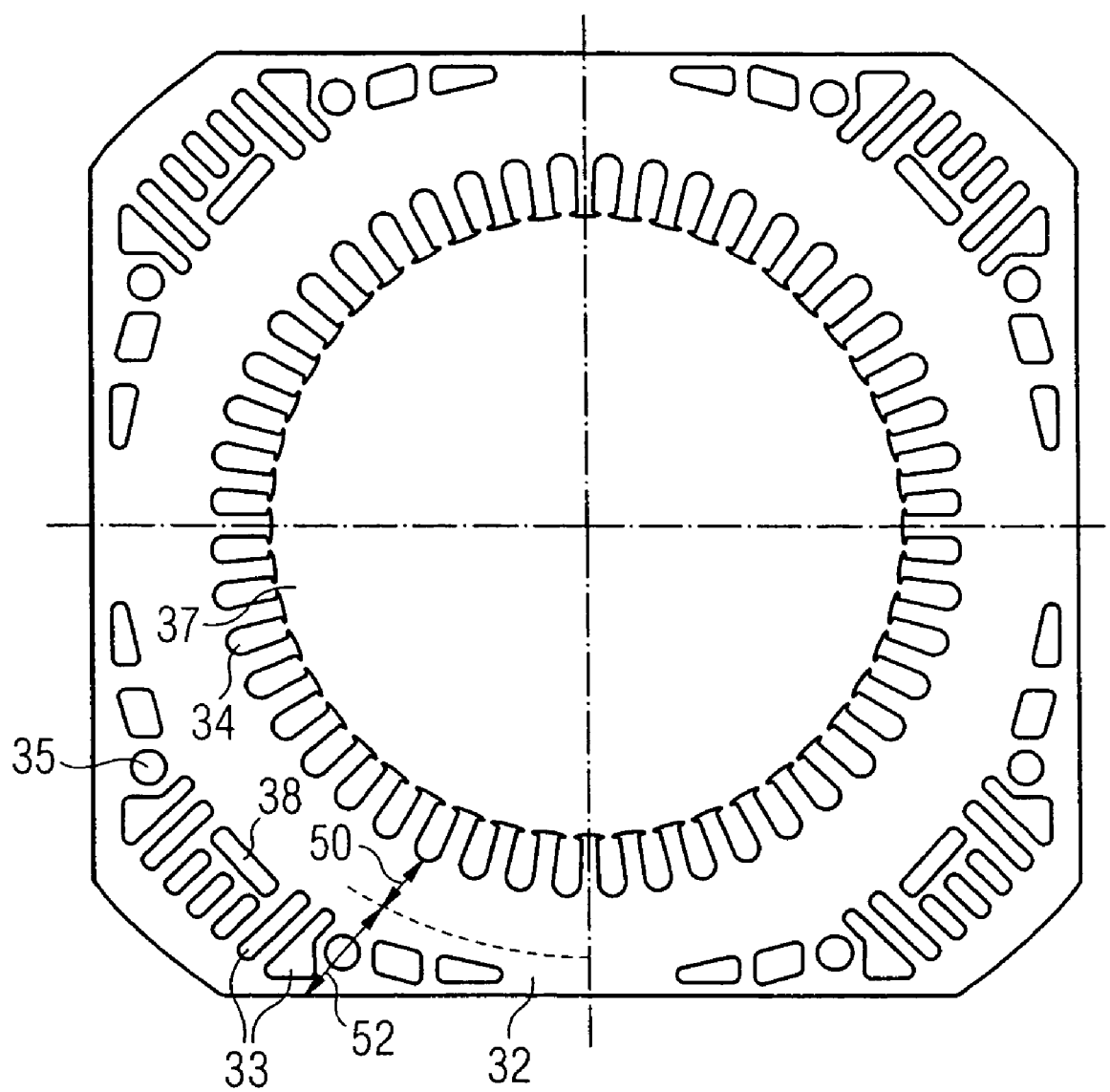
FIG. 8 shows schematically a cutout or stamped metal sheet of a stator forming the primary section of a rotary machine.

FIG. 8 shows a cross-sectional view of a stator sheet metal 32 of a rotary electric machine. Cooling channels 33 are disposed in the stator sheet metal 32. The stator sheet metal 32 also includes rod channels 35 in which anchor rods (not shown) can be inserted that hold the stator sheet metal together. The stator sheet metal 32 has stator grooves 34 adapted to receive windings. A stator sheet metal laminate with the windings forms the primary section of the rotary electric machine. An opening 37 is provided for receiving a rotor. The cooling channels 33 and the additional channels 38 are provided for receiving closed conducting loops.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An electric AC machine comprising:
    a primary section and a secondary section, with the primary section having a first region facing the secondary section and a second region facing away from the secondary section, the first region including windings adapted to receive an AC current and the second region including a cavity,
    at least one phase conductor, which at least partially extends through the cavity, and
    a short-circuited conducting loop having a first section disposed next to the at least one phase conductor inside the cavity and electromagnetically coupled with the at least one phase conductor, and a second section disposed outside the cavity and facing away from the first region.

2. The electric AC machine of claim 1, wherein the at least one phase conductor and the short-circuited conducting loop at least partially surround a body that conducts the magnetic flux or an air gap disposed on this body.

3. The electric AC machine of claim 1, wherein the primary section includes a magnetic flux conducting means comprising a sheet metal laminate.

4. The electric AC machine of claim 3, wherein the magnetic flux conducting means is formed in at least two parts, with a first of the two parts being formed by the sheet metal laminate and a second of the two parts being formed by a bridge, said sheet metal laminate and said bridge forming The cavity.

5. The electric AC machine of claim 4, wherein the sheet metal laminate and the bridge form an air gap.

6. The electric AC machine of claim 1, wherein the electric AC machine is a three-phase machine having a plurality of phase conductors, wherein those phase conductors of the plurality of phase conductors that have in normal three-phase operation a zero sum current are grouped and extend together with the short-circuited conducting loop through the cavity.

* * * * *